United States Patent [19]

Lo

[11] Patent Number: 5,638,743
[45] Date of Patent: Jun. 17, 1997

[54] CHARCOAL BARBECUE

[75] Inventor: Chuan Hsin Lo, Taichung, Taiwan

[73] Assignee: Wan Yeh Enterprise Co., Ltd., Taipei, Taiwan

[21] Appl. No.: 702,321

[22] Filed: Aug. 23, 1996

[51] Int. Cl.⁶ .............. A23L 1/00; A47J 37/00; F24B 3/00; F24C 1/16
[52] U.S. Cl. .............. 99/447; 99/446; 99/449; 99/450; 126/9 A; 126/25 R
[58] Field of Search .............. 99/339, 340, 400, 99/401, 444–446, 447, 449, 450, 481, 482; 126/9 A, 9 R, 25 R, 43, 39 M, 221, 332, 239; 206/541; 229/23 R; 426/523; 428/131, 179, 181, 596

[56] References Cited

U.S. PATENT DOCUMENTS

| | | | |
|---|---|---|---|
| 3,583,309 | 6/1971 | Freidenrich | 99/445 |
| 3,625,195 | 12/1971 | Grall | 126/9 A |
| 3,682,154 | 8/1972 | Mollere | 126/9 A |
| 3,895,622 | 7/1975 | Krueger | 99/340 X |
| 4,140,099 | 2/1979 | Newport | 126/9 R |
| 4,257,338 | 3/1981 | Chasek | 126/510 |
| 4,332,828 | 6/1982 | Gallagher | 99/447 |
| 4,782,812 | 11/1988 | Kellerman | 126/9 A |
| 4,840,118 | 6/1989 | Rinehart | 99/447 X |
| 4,969,449 | 11/1990 | Levin | 126/25 R |
| 5,176,124 | 1/1993 | Wrasse | 126/25 R |
| 5,325,841 | 7/1994 | Hooper, Sr. | 99/339 |
| 5,437,222 | 8/1995 | Franklin | 99/450 |

*Primary Examiner*—Timothy F. Simone
*Attorney, Agent, or Firm*—Donald C. Casey

[57] ABSTRACT

A charcoal barbecue having a layer of aluminum foil covered a rectangular corrugated box is forming an outer of the charcoal barbecue. The bottom portion of one side thereof is cut to form two door panels and can be opened into a ventilation orifice, inner side of said box with an aluminum foil and a partition rack positioned at the top portion of said box. Smoke-free charcoals are arranged in the top of the rack and a bulge is disposed in a corrugated board for fixing the top of said smoke-free charcoals. Two sides smoke-free charcoals. Two sides of the corrugated board are disposed with oil-absorbing paper and a rectangular fixing board is positioned at the top of said smoke-free charcoals. An inverted 'U' shape barbecue mesh is engaged with the top of the corrugated box.

1 Claim, 5 Drawing Sheets

CHARCOAL BARBECUE

FIELD OF THE INVENTION

This invention generally relates to the art of a barbecue, particularly, to a convenient light-weight charcoal barbecue.

BACKGROUND OF THE INVENTION

The conventional means for charcoal barbecue can be distinguished from two kinds:

1. Using a metal mesh as the main barbecue;
2. Using a metal rack as the main barbecue;

Undesirable factors for both means are as follows:

1. With the first mean, users must bring metal mesh and charcoals outdoor and then seek for rocks or bricks as support before barbecuing. However, as the support is made by temporary structure, it is liable to collapse from force and rob the users of the recreational pleasure of the activity. Moreover, the random sparks ensued could easily result in forest fires.
2. With the second mean, users must bring metal racks outdoor. Though it has solved the problem for the collapse of the structure, the metal racks are cumbersome for journey. The structure also makes inconveniences such as cleaning, taking and storage.
3. Neither of said conventional means can achieve the function of easy ignition and heat intensity control which often result in charring and waste of charcoal that not only disturb the atmosphere of the activity, serious consequences such as physical burns often incur.

SUMMARY OF THE INVENTION

The research and development for a product, concept, or theory invariably incur various spiritual and economic frustrations and predicaments during the process; the hardship of which is difficult to understand for those who are not engaged in the activity of invention. Nevertheless, if this invention is able to function more efficiently through more convenient or practical means, such hardship would simply transpire in joy.

On account of the above reasons and based on years of experience, the present discloses a charcoal barbecue that is equipped with the functions of safe as well as easy ignition and conveniently portable.

An object, therefore, of the invention is to provide a simply and improved structure barbecue for overcoming the collapse problem of the conventional means. Such improved structure is stable that prevents occurences of collapse due to force and light in weight. In the present invention disclosed herein, the charcoal ignition of which is rapid and safe with the function of adjustable heat intensity to prevent time-consuming ignition or injury accidents that affect the pleasure of barbecue activity.

Another object of the invention is to provide a safe charcoal barbecue which not only increase the value of the product, but also contribute to enhancement of life quality.

BRIEF DESCRIPTION OF THE DRAWING

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
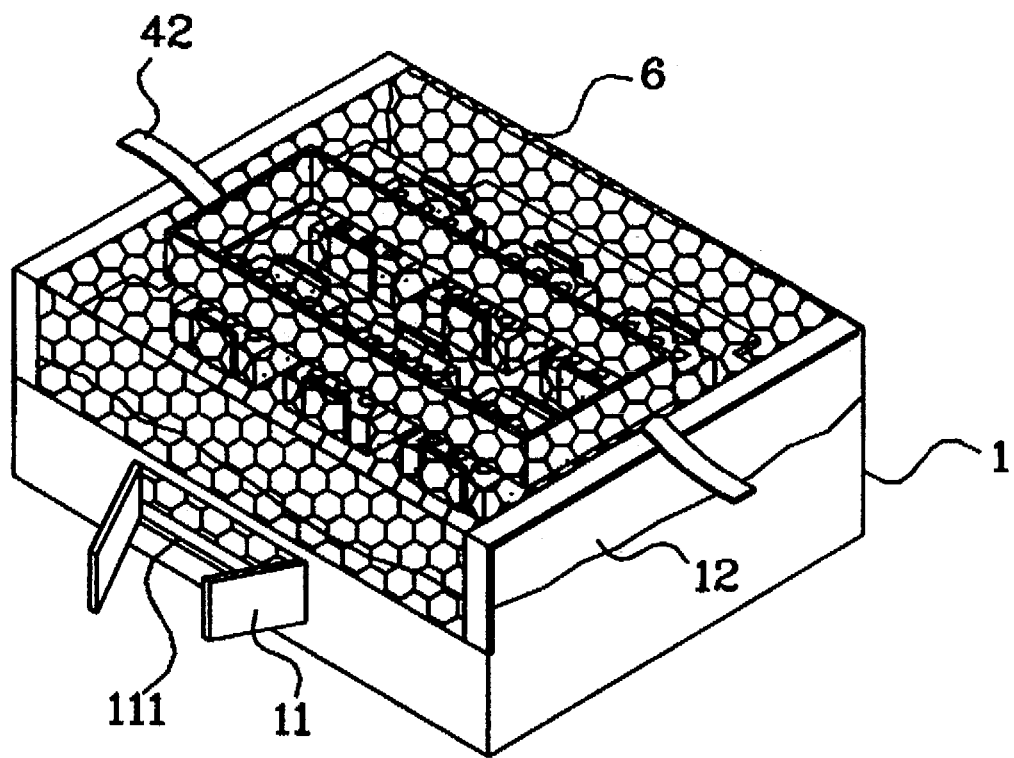
FIG. 1 is a perspective view of the invention.
Figure 2:
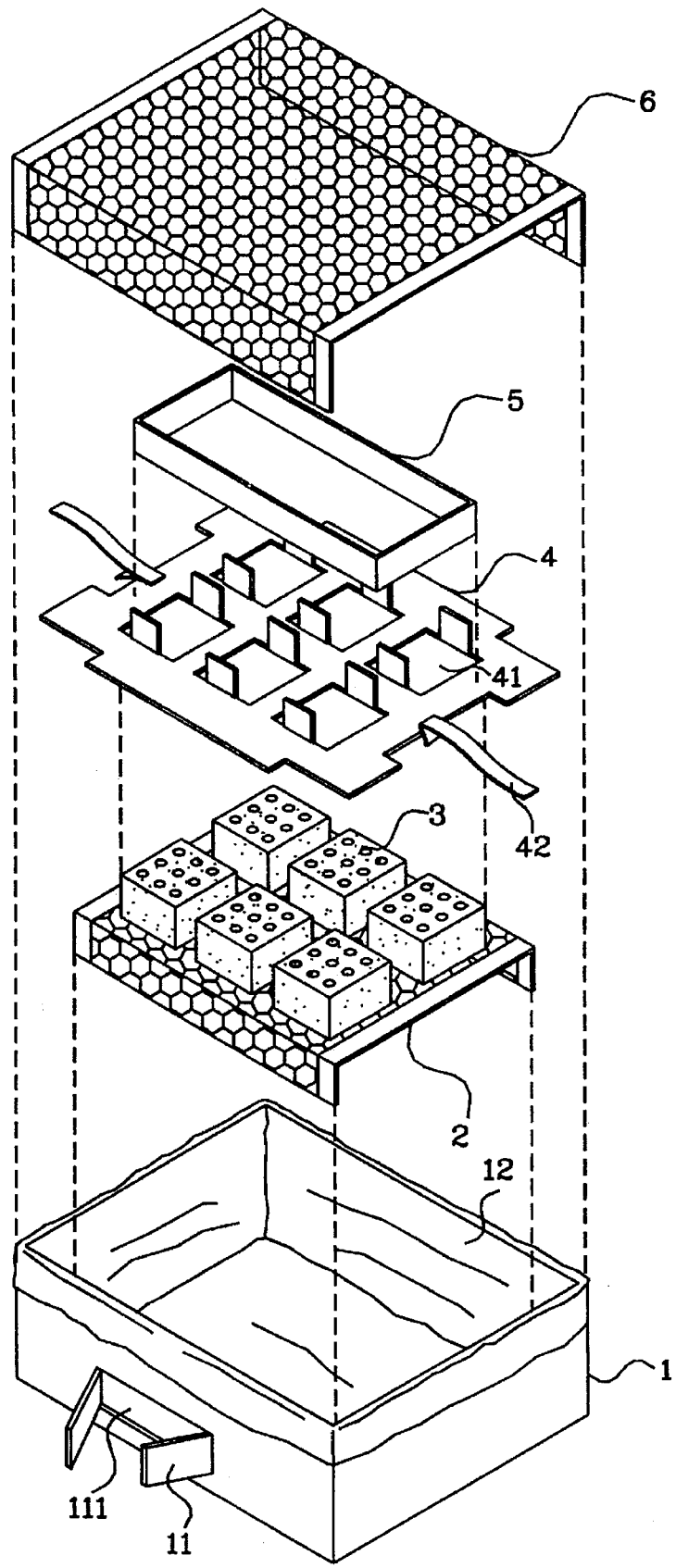
FIG. 2 is an exploded view of the invention.
Figure 3:
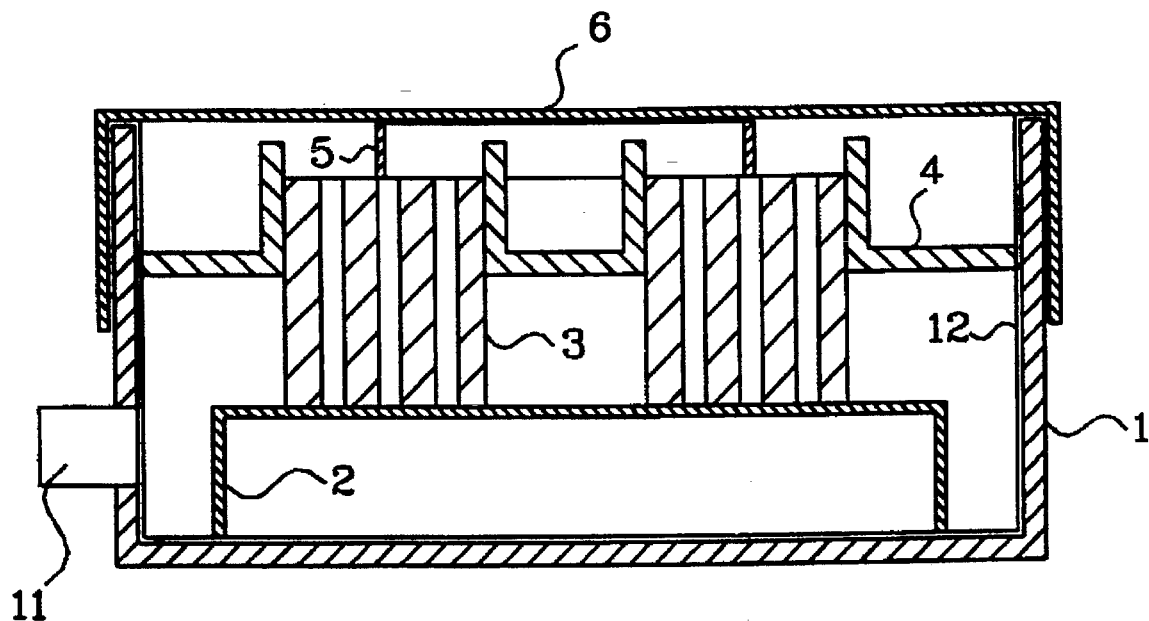
FIG. 3 is a section view of the invention.
Figure 4:
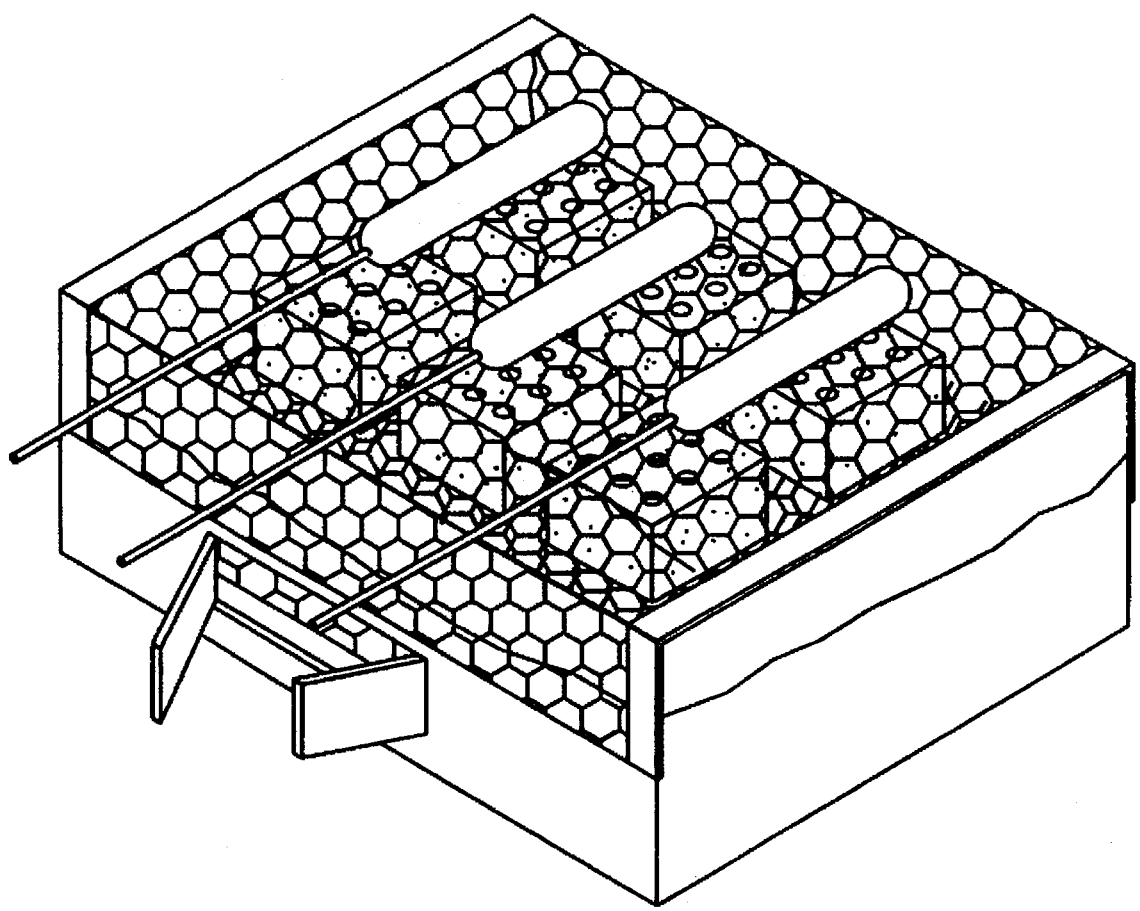
FIG. 4 is a embodiment of the invention.
Figure 5:
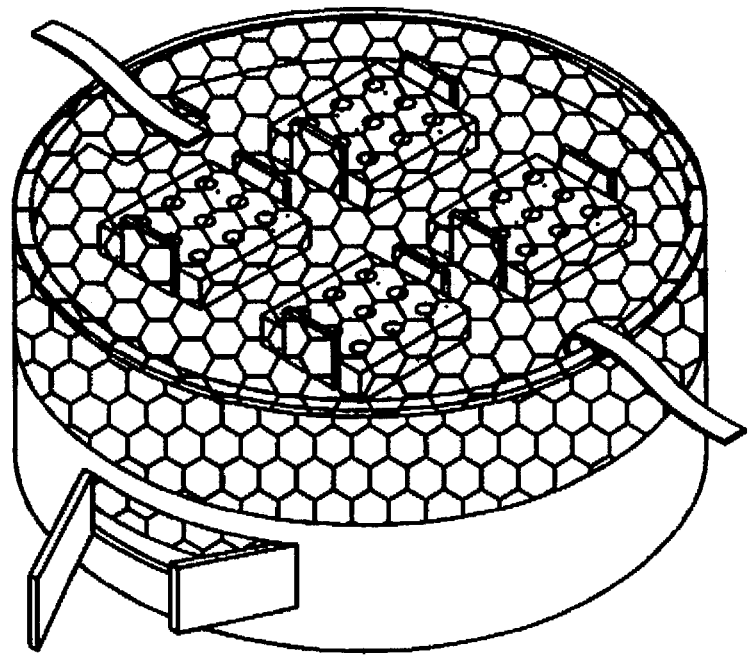
FIG. 5 is a another embodiment of the invention.

FIG. 2 is an exploded view of the invention. Referring to FIG. 2, the invention is embodied in a rectangular corrugated box 1 forming a main body, bottom portion of one side thereof is cut to form two door panels 11 which can be opened into a ventilation orifice 111 for adjusting the height of a flaming point, inner side of said main body with an aluminum foil 12 for preventing burning of the corrugated box 1. Then a partition rack 2 is position at the top portion of said main body and the bottom portion forming a storage space creating a vent for burning up ashes to achieve its combustion function. Smoke-free charcoals 3 are arranged in the top of a rack and a bulge 41 is disposed in a corrugated board 4 for corrugated board 4 for fixing the top of said smoke-free charcoals 3. Two sides of the corrugated board 4 are disposed with oil-absorbing paper 42 and a rectangular fixing board 5 is positioned at the top of said smoke-free charcoals 3 for making the smoke-free charcoals 3 stationed and increasing central combustion. An inverted 'U' shape barbecue mesh 6 is engaged with the top of the corrugated box 1. For using the invention, operator first igniting the oil-absorbing paper 42 positioned at two sides for generate the burning of the smoke-free charcoals 3 until a certain intensity. When the flaming point is too height, the inverted "U" shape barbecue mesh 6 can be elevated or the door panels 11 can be adjusted to reduce the aperture of the ventilation orifice 111.

It will be understood that the invention may be embodied in other specific forms without departing from the spirit or central characteristics therefore, are to be considered in all respects as illustrative and not restrictive, and the invention is not to be limited to the details given herein.

I claim:

1. A charcoal barbecue characterized in that:

a rectangular corrugated box forming an outer of said barbecue, bottom portion of one side thereof which is cut to form two door panels and can be opened into a ventilation orifice, inner side box with an aluminum foil and a partition rack positioned at the top portion of said box;

smoke-free charcoals arranged in the top of the rack and a bulge disposed in a corrugated board for fixing the top of said smoke-free charcoals, two sides of the corrugated board disposed with oil-absorbing paper and a rectangular fixing board positioned at the top of said smoke-free charcoals; and, an inverted 'U' shape barbecue mesh engaged with the top of the corrugated box.

* * * * *